June 25, 1935.    H. ANTRANIKIAN    2,005,962
ELECTROMOTIVE FORCES COMPARING DEVICE
Filed June 27, 1933
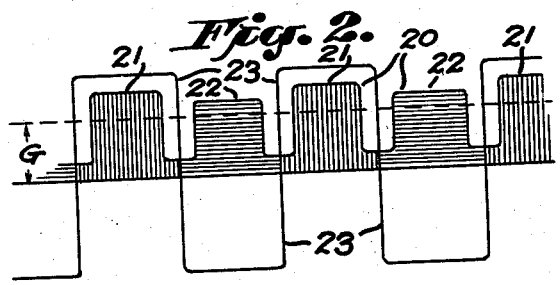
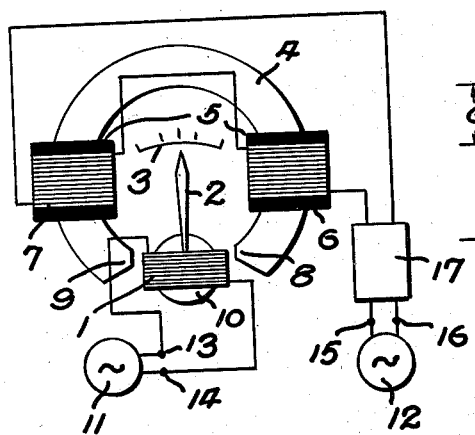
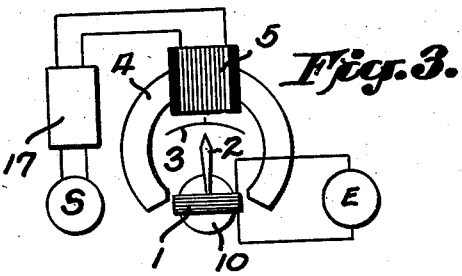
Fig. 1.
Fig. 2.
Fig. 3.
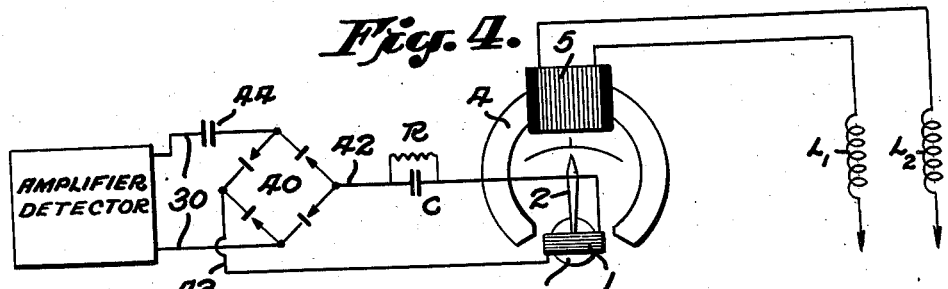
Fig. 4.
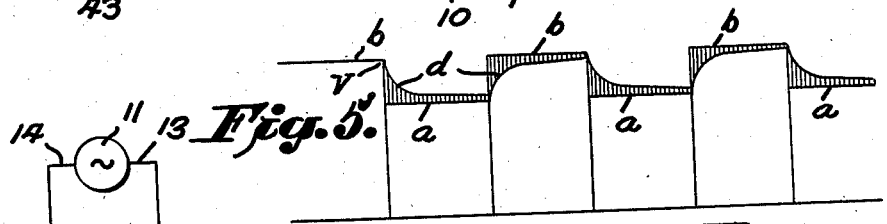
Fig. 5.
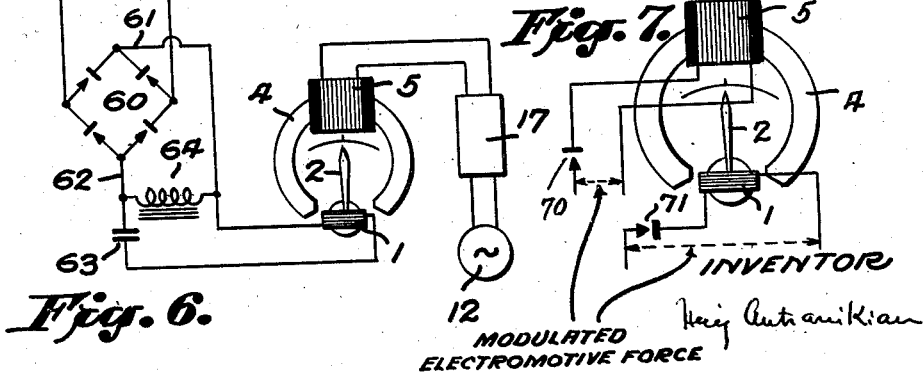
Fig. 6.    Fig. 7.
MODULATED
ELECTROMOTIVE FORCE
INVENTOR
Heig Antranikian Patented June 25, 1935

2,005,962

UNITED STATES PATENT OFFICE 2,005,962

ELECTROMOTIVE FORCES COMPARING DEVICE

Haig Antranikian, Paris, France

Application June 27, 1933, Serial No. 677,949

10 Claims. (Cl. 172—245)

The invention relates to improvements in devices for comparing the phases of two periodical currents or electromotive forces, or else for comparing the average amplitudes of two alternate parts of a period of a periodically variable current or electromotive force. These currents or electromotive forces may have or not a sine curve as representative curves.

It is unnecessary to mention cases in which phases of two electromotive forces are to be compared as it is of common practice. But for the comparison of the average amplitudes of two alternate parts of a period of an electromotive force (or current)—which will be referred to in the following specification by the expression: two alternate parts of an electromotive force (or current)—special reference will be made to radio direction finders many of which operate by the comparison at the output of an amplifier of two alternate receptions of a signal; as direction finders of this type may be mentioned those described in my British Patent No. 322,805, or in U. S. Patent No. 1,868,945, or in German Patent No. 481,703, or else the direction finder described in the Air Commerce Bulletin (U. S. Department of Commerce) vol. 3, No. 18, Page 433.

In the devices heretofore used for indicating differences of phase—specially in those used for observing coincidence of phase of currents in two circuits—complicated circuits or means for balancing the currents in the two circuits are used. With the instrument and arrangements according to the invention the circuits are simple and no balance of the currents is necessary. Likewise, for the comparison of two alternate parts of an electromotive force—specially in the direction finders above mentioned—generally two balanced circuits are used in connection with a galvanometer. With the instrument and arrangements herein disclosed such balanced circuits are useless, and thereby is avoided the adjustments required by such balanced circuits. These improvements are accomplished mainly by the use of an instrument which is a part of all the arrangements illustrated herein. A further improvement is disclosed in the following paragraphs in the case that two alternate parts of a periodical electromotive force are to be compared. Hitherto in such cases—for example, in the direction finders above mentioned—the whole alternate currents (due to the alternate parts of the electromotive force) were flowing through the meter for observing the differences; as these differences are small relatively to the whole currents, a great part of these currents is an overload on the sensitive meters generally used. A simple device, as will be explained hereunder, overcomes this defect. This device (a shunted condenser) may be used with instruments other than the special instrument shown in the drawing, as would be the case when the device is used in the output circuit of the above mentioned British patent.

An object of the invention is to provide a sensitive instrument for directly comparing either the phases of two electromotive forces—which may be of different amplitudes or not—or the average amplitudes of two alternate parts of an electromotive force.

Another object of the invention is to provide arrangements for preventing the unnecessary currents to flow through a difference of amplitudes indicating instrument or through any circuit where the differences of amplitudes only are useful.

The foregoing and other objects of the invention will clearly appear by reference to the following specifications and drawing in which:

Figs. 1 and 3 are diagrammatic views of the instrument for comparing phases of two electromotive forces or for comparing the alternate parts of an electromotive force;

Fig. 2 is a diagram for explaining the operation of the instrument according to the invention when used for the comparison of the two alternate parts of an electromotive force;

Fig. 4 is a diagrammatic view of the arrangement for preventing the unnecessary currents to flow through the instrument of Fig. 1, shown as applied to an apparatus of the kind described in said Air Commerce Bulletin.

Fig. 5 is a diagram for the explanation of the operation of the arrangement of Fig. 4.

Fig. 6 illustrates an arrangement for indicating differences of phase when the instrument of Fig. 1 is used in connection with a modulated electromotive force.

Fig. 7 shows the circuit arrangements for the use of the instrument in connection with two electromotive forces which are modulated.

In the preferred embodiment shown in Fig. 1 of an instrument for comparing phases or for comparing the alternate parts of a periodical electromotive force—which will herein be referred to as the instrument I—a winding 1 is movable about a pivotal axis, similar to the movable coil of an ordinary galvanometer or the like; a pointer 2 may be added to the movable winding 1 to make indications on a scale 3. A fixed winding 5 of one or more coils such as 6, 7— connected in series, as shown, or in parallel, as the case may be—is wound on a magnetic field carrying member or magnetic member 4; this member 4 is preferably made with a metal having little or no permanent magnetism, and very permeable to variable flux densities, such as soft iron or the like; the ends 8, 9, of this member are arranged to concentrate on winding 1 the flux produced in the member 4 by the currents in the winding 5; as the instrument is intended to be generally used as a null-point indicator, or equal current indicator, which should have best sensitivity at the neutral position, it is preferred to have the ends 8, 9 of the member 4 bevelled so as to concentrate the most of the flux on the neutral position of the movable winding 1. The sensitivity is further increased if, as in ordinary galvanometers, a core 10 is added within the movable winding 1. When the currents in winding 1, or 5, or both, have a relatively short period, or have rapid variations, it is preferred also that the field member 4, or the core 10, or both, be made in sheets (as in alternating current machines) in order to avoid the effects of eddy currents in the metal; the thickness of the sheets should naturally be proportioned to the period or rapidity of variations of the currents in the windings.

Considering first the comparison of the phases of two electromotive forces, the instrument I just described operates as follows. The electromotive forces, the phases of which are to be compared, are supposed in Fig. 1 to exist respectively at the terminals 13, 14 and 15, 16, of two sources symbolically indicated at 11 and 12; the terminals 13, 14 are connected to the terminals of the movable winding 1 and the terminals 15, 16 are connected to the terminals of the fixed winding 5 through a phase changer 17; this phase changer may be omitted if not necessary, as it will be more clearly understood in the following paragraph: it is supposed to be of a known type.

When the currents in the windings 1 and 5 have sine curves as representative curves it may be demonstrated that the movable coil receives two alternate equal impulses of opposite directions when the difference of phase between the currents in the two windings is 90 degrees and, hence, owing to the inertia of the movable part, the pointer will give a null indication for this difference of phase between the currents. Therefore, the instrument is able to indicate whether the phases of two electromotive forces, namely the electromotive forces originated at 11 and 12, have a predetermined relation or not, since these electromotive forces have phases in constant relation with the phases of the currents in the two windings, as is known. As the phase relation between the electromotive force originated at 12 may be changed by the phase changer 17, any desired relation of phase may be given to the current in winding 5 with regard to the electromotive force originated at 12; therefore the instrument combined with this phase changer may indicate any desired relation between the electromotive forces originated at 11 and 12; it may be easily understood that the phase changer may be calibrated to indicate by a direct reading on a scale the difference of phase between said electromotive forces when this phase changer is adjusted to have a null reading on the instrument I.

When the currents in the windings are not of the sine type the indications of the instrument may not correspond to the same indications of phase as when the currents are of the sine type; however, even in this case the instrument and the phase changer may be calibrated to indicate any desired relation of phase between the electromotive forces giving the currents in the windings 1 and 5.

It was supposed in the foregoing that the phase changer was in the circuit of winding 5, but it is readily understood that the same results may be obtained with a phase changer inserted in the circuit of winding 1, or with a phase changer in both circuits of windings 1 and 5.

The indications of the instrument I are practically independent of the amplitudes of the currents in the windings 1 and 5, at least when the currents may be represented by a curve symmetrical relatively to an axis. These indications are not disturbed if a constant direct current is added in one of the windings; this is because the constant flux produced by this constant current gives to the movable winding 1 two alternate impulses in opposite directions which are equal, since the impulses are proportional to the multiplication of the constant flux in one of the windings by the current of alternate sign in the other winding. Care should be taken in this case, however, that the addition of a direct current in one of the windings does not saturate the magnetic member 4 or the core 10 of the windings.

It may occur that one of the electromotive forces, the phases of which are to be compared, or both electromotive forces, are modulated electromotive forces and should be rectified before their phases are compared. Fig. 6 shows an arrangement for this purpose, with the assumption that the electromotive force originated at 11 only is modulated. The terminals 13, 14 are connected to two of the terminals of a full wave rectifier 60—shown as being similar to the type of the well known copper oxide full wave rectifier—the other ends 61, 62, of the rectifier being connected to the winding 1 of the instrument I through a condenser 63; this condenser is inserted in the circuit in order to stop the direct current formed by the rectification. A choke coil 64 may be added in shunt on the same terminals 61, 62 to allow the direct current just mentioned to flow; this choke coil 64 should have a great impedance at the frequency of the electromotive forces, as is known. The capacity and choke coils are not essential to the operation of the instrument and may be omitted when the direct current does not overload the winding 1. The winding 5 is connected to the non-modulated electromotive force originated at 12. The operation of the arrangement of Fig. 6 is obvious.

When the electromotive forces which are to be compared are both modulated, they are connected to the windings 1 and 5 through rectifiers 70, 71 as shown in Fig. 7; this arrangement can be readily understood and its operation is obvious in view of the foregoing.

The same instrument I as described above is able to indicate a difference between the average amplitudes of the two alternate parts of a periodical electromotive force E. For this purpose in Fig. 3 one of the windings, say winding 1, is connected with the electromotive force E and the other winding, say winding 5, is connected to a source of alternating current S synchronized with said electromotive force E. By the word "synchronized" it must be understood that the current S has the same period as the electromotive force E and that each half period of the alternating current coincides approximately with one of the alternate parts of electromotive force E; in other words the synchronized current and the electromotive force should have same period and same phase; an exact coincidence of phase is not, however, necessary.

How the instrument I operates to compare the parts of an electromotive force E may be explained with reference to Figs. 2 and 3, where it is assumed, for simplicity of explanation, that the current due to the electromotive force E—connected with the winding 1 (Fig. 3)—has always the same sign and is represented by the rectangular shape curve 20 (Fig. 2), and the synchronized source S—connected with winding 5—gives in this winding a current represented by the rectangular shape curve 23. As the fluxes in the windings are about proportional to the currents, the curves 20 and 23 may represent also the fluxes due respectively to the electromotive force E and to the synchronized currents. Then, it may be easily understood that the impulses given to the movable coil 1 may be represented by the shaded areas, the areas shaded vertically giving impulses in one direction and the areas shaded with horizontal lines giving impulses in the opposite direction, since the impulses are proportional to the fluxes and since the flux in winding 5 is alternately of opposite sign. Thence, if the two parts 21 and 22 of the current 20 are of equal amplitude the impulses given to the winding 1 will be equal and alternately in opposite directions and, because of the inertia and dampening (if there is any) of the movable part, the pointer will remain in its neutral position (the instrument will read null); if one of the parts is of a greater amplitude than the other—say, the part 21 of greater amplitude than the part 22—the needle will deflect in one direction because it receives unequal impulses in opposite directions; the direction of deflection is changed when the part that has the greater amplitude is changed—say, when the part 22 has greater amplitude than the part 21.

It is readily understood that the same indications may be obtained if the connections of the windings 1 and 5 are interchanged, that is, when the electromotive force E is connected with the winding 5 and the synchronized electromotive force S is connected with the winding 1. It may be also readily understood that, although not shown in Fig. 3, a phase changer may be added as explained in relation with Fig. 1 in one of the circuits in order to synchronize the currents in the two windings.

Therefore, the instrument I, connected to a periodical electromotive force having two parts and to a synchronized current, is able to indicate whether there is or not a difference of average amplitude between the two parts of the electromotive force and, if there is a difference, which of the alternate parts of the electromotive force is of greater amplitude, this latter indication being made by the direction of deflection of the needle.

For the same reason as explained above a constant current added or subtracted from the current given by the electromotive force E does not change the indications of the instrument. Thus a constant current G may be subtracted from the current 20; it is easily seen on Fig. 2 that the resultant current is a current having alternately opposite signs; therefore the instrument I is able to indicate differences of amplitudes of two alternate parts even when each of the two alternate parts has alternating signs. It is obvious that, conversely, when the alternate parts are of alternating signs, they may be rendered of the same sign by addition of a direct current.

In the radio direction finders, such as those mentioned above, the differences between the two alternate parts of the periodical outputs which are to be compared are generally very small relatively to the total amplitude of current; this total amount of current is not useful since the differences only are used for the indications; on the other hand, the great amount of current which does not cooperate for the indications may give strong vibrations or flickers to the needle and may overload uselessly the instrument. A very simple device which eliminates a great part of the undesirable currents without weakening much the differences will be explained in relation with Figs. 4 and 5.

In Fig. 4, omitting for the moment the part at the left of the terminals 42, 43, it is assumed that a periodical electromotive force having two alternate parts of the same sign is applied at these terminals 42, 43 and that a synchronized current is applied to the winding 5. One of the terminals, for instance 43, is directly connected to the winding 1; the other terminal, 42, is connected to the other terminal of winding 1 through a condenser C in series and a resistor R, also in series with the winding 1, but in shunt with the condenser C. It is the condenser C shunted with resistor R that constitutes the device for eliminating the undesirable part of the current which may flow through the winding 1. The operation of this device may be explained as follows with reference to Fig. 5, where the electromotive force at the terminals 42, 43, is represented as having the two alternate amplitudes $a$ and $b$ which correspond to the parts 21 and 22 of Fig. 2; for clearness of explanations, however, the electromotive force is supposed, in Fig. 5, to vary from one amplitude to the other without transition. Assuming that at a certain moment the voltage at the terminals of the condenser C is represented by the point V, the voltage applied to this condenser through the winding 1 being lower at the next moment, the condenser C discharges itself through the resistor R (it is supposed that this condenser cannot discharge through the circuit of the winding 1); if this resistor is properly chosen the discharge, represented by the curve $d$, will cause the electromotive force to be nearly equal to $a$ when the amplitude of the electromotive force rises again to $b$; then, the electromotive force applied to C being $b$, the condenser charges again and the current of charge flows through the winding 1 (neglecting the current which may flow through the resistor R); at the end of the time that the electromotive force is equal to $b$, the voltage at the terminals of condenser C will be nearly equal to $b$, and so on. It is easily seen that the condenser charging through the winding 1 and discharging through the resistor R, alternately, the total result is nearly to allow the differences of voltage alone to act on the winding 1 without allowing the whole amplitude $a$ (or $b$) to act on this winding. As the discharges and charges of the condenser are not instantaneous, a slight part of the differences between the alternate parts of the electromotive force is lost (corresponding to the shaded part of Fig. 5), but if it is recollected that, in apparatus such as mentioned at the beginning of this specification, the amplitude $a$, for instance, may be hundreds times the difference between the amplitudes $a$ and $b$, the weakening of the difference is negligible relatively to the weakening of the undesirable part of current which is prevented to flow through the winding 1. It is obvious that the same result may be obtained if the electromotive force at the terminals 42, 43, is applied to winding 5 through the condenser C and the resistor R and the synchronized current is applied to the winding 1, according to what has already been explained.

It will be understood by persons familiar with the art that the same results will be obtained when the changes of amplitudes are not as sudden as indicated in Fig. 5, although the charge and discharge of the condenser may follow more complicated laws.

In the drawing the resistor R is represented outside of the condenser; it is obvious that the same result will be obtained when the resistor is in the condenser itself, or if the condenser has a leak which permits its discharge, as is the case if C is an electrolytic condenser; therefore, it must be understood that the resistor R may be, in part or totally, in the condenser itself.

At the left of Fig. 4 is indicated how the device just described should be attached to a direction finder of the type described in the Air Commerce Bulletin mentioned above, or to the like. The terminals 42, 43 are connected through the rectifier 40 to the output terminals 30 of the amplifier, also through a condenser 44 if desired. The rectifier 40, shown as being similar to the well known copper-oxide full wave rectifier type—but which may be of any other known type—is added because generally the output of the amplifier is a modulated electromotive force which must be rectified in order to have alternately two parts of the electromotive force of the same sign at the terminals of condenser C. It is readily seen that, as supposed before, the condenser C cannot discharge (or discharges very little) through the circuit of winding 1 since the rectifier has a high resistance for the currents which would flow back. The winding 5 is connected to the "synchronizing unit" through the choke coils L1 and L2, according to the diagram of said bulletin, where the corresponding choke coils are indicated by reference letters L4 and L5 and in which the part at the right of the amplifier is replaced by the device just described.

Although the means for eliminating the undesirable part of the currents which would flow through a circuit has been described as being applied to the circuit of an instrument for indicating differences of amplitudes of two parts of an electromotive force, it is obvious that the same means may be applied to any circuit in which only the differences of two alternate parts are useful and will still be in the scope of this invention.

What I claim is:

1. In combination, a circuit subject to a periodical electromotive force having two alternate parts which may vary relatively to each other, a movable winding, a fixed winding, means connecting one of the windings to said circuit, means connecting the other winding to a source of alternating current synchronized with said periodical electromotive force, and a magnetic field carrying member within the fixed winding for concentrating the flux of the fixed winding on the movable winding.

2. In combination, two circuits each subject to an alternating electromotive force, a movable winding connected to one of said two circuits, a fixed winding connected to the other of said two circuits, a phase changer connected with one of the windings for adjusting the phase of the current in that winding with respect to the phase of the current in the other winding, and a magnetic field carrying member within the fixed winding for concentrating the flux of the fixed winding on the movable winding.

3. In combination, a circuit subject to a periodical electromotive force having two alternate parts which may vary relatively to each other, a movable winding, a fixed winding, means connecting one of the windings with said circuit, means connecting the other winding to a source of alternating current, a phase changer connected with said other winding to synchronize the alternating current with the periodical electromotive force, and a magnetic field carrying member within the fixed winding for concentrating the flux of the fixed winding on the movable winding.

4. In combination, a circuit subject to a modulated electromotive force and a circuit subject to a non-modulated electromotive force, a movable winding, a fixed winding, a rectifier in one of the windings, means connecting said one of the windings and the rectifier to the circuit subject to a modulated electromotive force, means connecting the other winding to said circuit subject to a non-modulated electromotive force, and a magnetic field carrying member within the fixed winding for concentrating the flux of the fixed winding on the movable winding.

5. In combination, two circuits each subject to a modulated electromotive force, a movable winding connected to a rectifier and with one of said two circuits, a fixed winding connected to another rectifier and with the other of said two circuits, and a magnetic field carrying member within the fixed winding for concentrating the flux of the fixed winding on the movable winding.

6. In combination, a circuit subject to a modulated periodical electromotive force having two alternate parts which may vary relatively to each other, a movable winding for indicating a difference between said alternate parts, a rectifier in series with said movable winding, a condenser in series with the winding and the rectifier, means connecting the circuit formed by the winding, the rectifier and the condenser in series with said circuit, a means in shunt with the condenser for discharging the condenser periodically, and means for giving to the movable winding impulses proportionate to the currents in the same and in one direction during the passage of the currents due to one of said parts and in the opposite direction during the passage of the currents due to the other of said parts.

7. In combination, a circuit subject to a periodical electromotive force having two alternate parts which may vary relatively to each other, a movable winding for indicating a difference between said alternate parts, a fixed winding, a condenser in series in the circuit of one of the windings, a means in shunt with the condenser for discharging the same, means connecting said circuit of one of the windings with said circuit subject to a periodical electromotive force, means connecting the other winding with a source of alternating current synchronized with said periodical electromotive force, and a magnetic field carrying member within the fixed winding for concentrating the flux of the fixed winding on the movable winding.

8. Apparatus for comparing the alternate parts of a modulated periodical electromotive force having, in combination, a movable winding for indicating a difference between said alternate parts, a fixed winding, a rectifier in the circuit of one of the windings, a condenser in series in said circuit of one of the windings, a means in shunt with the condenser for discharging the same, means connecting said circuit of one of the windings with said modulated periodical electromotive force, means connecting the other winding with a source of current synchronized with said periodical electromotive force, and a magnetic field carrying member within the fixed winding for concentrating the flux of the fixed winding on the movable winding.

9. Apparatus of the character described having, in combination, electrical means having at two terminals an output of periodical electromotive force of two alternate parts, a condenser one end of which is connected to one of said two terminals, means in shunt with the condenser for discharging the same, a winding one end of which is connected to the other end of the condenser, the other end of the winding being connected to the other of said two terminals, and means controlled by the currents in the winding for indicating a difference between said two alternate parts of the periodical electromotive force.

10. In combination, a circuit subject to rectified periodical currents having two alternate parts which may vary relatively to each other, a movable winding for indicating differences between said alternate parts, a condenser in series with the movable winding, means connecting said movable winding and the condenser in series to said circuit, means for discharging the condenser periodically, and means for giving to the movable winding impulses proportionate to the currents in the same and in one direction during the passage of the currents due to one of said parts and in the opposite direction during the passage of the currents due to the other of said alternate parts.

HAIG ANTRANIKIAN.